SOLID STATE INTERCOMMUNICATION SYSTEM

Filed Feb. 25, 1963 4 Sheets-Sheet 1

INVENTOR.
PAUL KORDA - S.P. REA
BY
[signature]
ATTORNEY

SOLID STATE INTERCOMMUNICATION SYSTEM

Filed Feb. 25, 1963 4 Sheets-Sheet 2

July 5, 1966 P. KORDA ETAL 3,259,698

SOLID STATE INTERCOMMUNICATION SYSTEM

Filed Feb. 25, 1963 4 Sheets-Sheet 3

United States Patent Office 3,259,698
Patented July 5, 1966

3,259,698

SOLID STATE INTERCOMMUNICATION SYSTEM

Paul Korda, West Los Angeles, and Sidney P. Rea, Vandenberg A.F.B., Calif., assignors to International Telephone and Telegraph Corporation, a corporation of Maryland Filed Feb. 25, 1963, Ser. No. 260,785
20 Claims. (Cl. 179—41)

This invention relates to intercommunication systems and more particularly to solid state systems adapted for connection into conventional telephone systems.

By definition an intercommunication system affords two-way communication with loudspeaker and microphone means at each station for localized use, as in a shop, airplane, or building. This definition adequately describes systems of the past, but it fails to take into account the needs of modern industry and science for better communications. These needs grow will the complexity of science and society.

Today's intercommunication system user must be in almost simultaneous communication with many people. For example, communications to, from and within a radio control tower for a busy airport illustrates one need. With one ear, a tower operator may listen to the pilot of a particular airplane. With the other ear, the tower operator may listen to instructions from a radar operator. At other times, perhaps the tower operator may be called over a conventional telephone system, as when an air line wishes to have information relayed to a pilot. Thus, the tower communciation system is complex, the needs are great, and reliability is imperative.

In the past, these intercommunication systems have utilized electromechanical relay switching circuits. These relays are admirably suited for use in their intended environment. In that environment, it is possible that they may never be replaced by any other device. However, environments do change. When this occurs, these relays cease to function properly or serve the required need. Then a replacement substitute becomes necessary.

Perhaps this need for a relay substitute may become more apparent from a study of one specific illustration of how a changed environment eliminates the possibility of relay usage. According to this illustration, a voice communication system is located in an underground silo used to launch rocket propelled vehicles. The voice signals require noise free, distortionless transmission paths. Space is at a premium; each cubic inch in the silo must be torn from the earth, air conditioned, dehumidified, lighted, and otherwise maintained. Power supply capacity is limited. Extreme reliability requirements are encountered. The mean time between failures must be very long; maintenance is difficult and physically uncomfortable to the repairman. No radio frequency interference is permissible. On occasions, as at launch time, mechanical shock is severe, and contaminants may fill the air. And so it goes, the differences between this environment and conventional relay environments is very long.

From the foregoing, one should perceive the advantages and disadvantages to be gained from intercommunicating systems of the type described. There is a need for a reliable, miniature, non-relay system which is compatable with any and all existing telephone switching equipment. An intercommunication system fulfilling these needs would have general utility and could be used widely. Therefore, the foregoing illustrations of intercommunications in a radio control tower and in a launching silo should be construed as arbitrarily selected examples. The invention is not necessarily either used in or limited to these particular systems.

Accordingly, an object of this invention is to provide new and improved intercommunication systems. In particular, an object is to provide intercommunication systems of general utility which may be used widely. Moreover, an object is to provide intercommunications systems adapted to interface with any and all commercial telephone systems.

A further object of this invention is to provide new and improved subassembly circuits primarily designed for use in intercommunication systems and yet designed to have general use in other systems as well.

Another object of this invention is to provide new and improved remote control devices. Here, a more particular object is to provide electronic relay substitutes without sacrificing relay characteristics. Another object is to provide modular electronic relay substitutes having general utility. Thus, an object is to provide extremely low loss "on" condition transmission and extremely high impedance "off" condition transmission. Furthermore, an object is to provide general purpose electronic relay circuits having a capacity to perform many different switching functions, such as make, break, and transfer.

A still further object is to provide circuits for converting signals transmitted between 2- and 4-wire systems. Here an object is to convert between ring-down and E–M lead signals. Another object is to provide converters for transmitting dial pulses.

Yet another object is to provide an intercommunicating switching system which independently switches circuits for energizing the two earphones of a headset.

In accordance with one aspect of this invention, a conventional two-wire telephone office of any suitable design is connected to a four-wire intercommunication system via a plurality of 2-to-4 wire converters. Each converter terminates an associated two-wire line by circuits having electrical characteristics that exactly coincide with the characteristics of a conventional telephone. The four-wire side of each converter connects via a separate dial line module to a number of common busses. Of these busses a transmit pair connects to a microphone, a receive pair connects to one earphone of a headset, and a monitor pair connects to the other earphone of a headset. This way an operator can select up to three idle dial line modules to complete three distinct paths from the common busses to the telephone offices. The operator can talk over a path extended through one dial line module, listen in one ear over a path extended through a second module and in the other ear over a path extended through a third module.

The above mentioned and other features of this invention and the manner of obtaining them will become more apparent, and the invention itself will be best understood by reference to the following description of an embodiment of the invention taken in conjunction with the accompanying drawings, in which.

Figure 1:
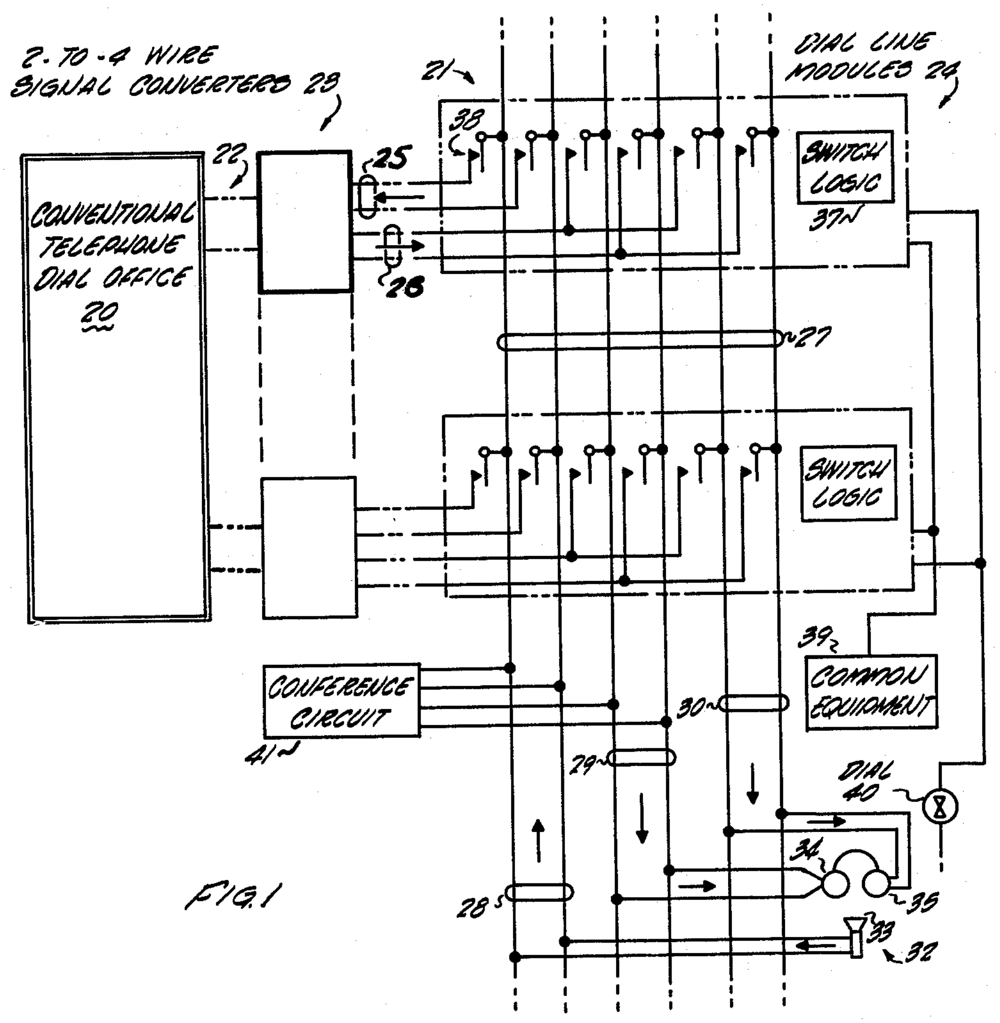
FIG. 1 is a block diagram showing an exemplary four-wire intercommunicating system connected to a conventional telephone office.

The system concepts will become apparent from a study of FIG. 1. There, a conventional dial telephone office 20 is connected to a four-wire intercommunication system 21 via a plurality of two-wire lines, such as 22. Each two-wire line terminates in an associated 2-to-4 wire signal converter 23. Ideally, each of these converters 23 should have electrical characteristics which exactly match the characteristics of a conventional subscriber telephone that might connect to line 22.

The four-wire side of each converter 23 connects to a separate dial line module 24, as, for example, via a transmit pair 25 and a receive pair 26. All of the dial line modules 24 are connected together by a number of common talking busses 27. Of these, one pair of busses 28 is adapted to connect to the four-wire transmit pair 25, and two pair of busses 29, 30 are adapted to connect to the four-wire receive pair 26. The operator (or other intercommunication system user) is provided with a suitable voice-to-electrical signal transducer, here shown as headset 32 having two earphones and a microphone 33. The microphone is connected to the transmit pair 28, one earphone 34 is connected to a receive pair 29, and the other earphone 35 is connected to a monitor pair 30. This way, the operator may listen in one ear to one conversation (such as with an airplane pilot) and in the other ear to another conversation (such as with a radar operator).

Means are provided for individualizing the headset 32 to specific connections with the four-wire pairs which cross all of the common busses 27. This means is here shown by a hollow block 37 marked "switch logic" and incorporated in a dial line module. When operated, this logic closes cross points, symbolically shown in FIG. 1 by contacts 38. In reality, moving contacts such as these can not be tolerated because they develop radio frequency interference (RFI). Later, more will be said about this feature.

Finally, the system comprises common equipment 39, a dial 40, and one or more conference call circuits 41. The dial 40 controls switching equipment in the dial office 20. The conference equipment 41 makes up losses in signal strength caused by the addition of more than two headsets 32 into the same talking circuit.

Figure 2:
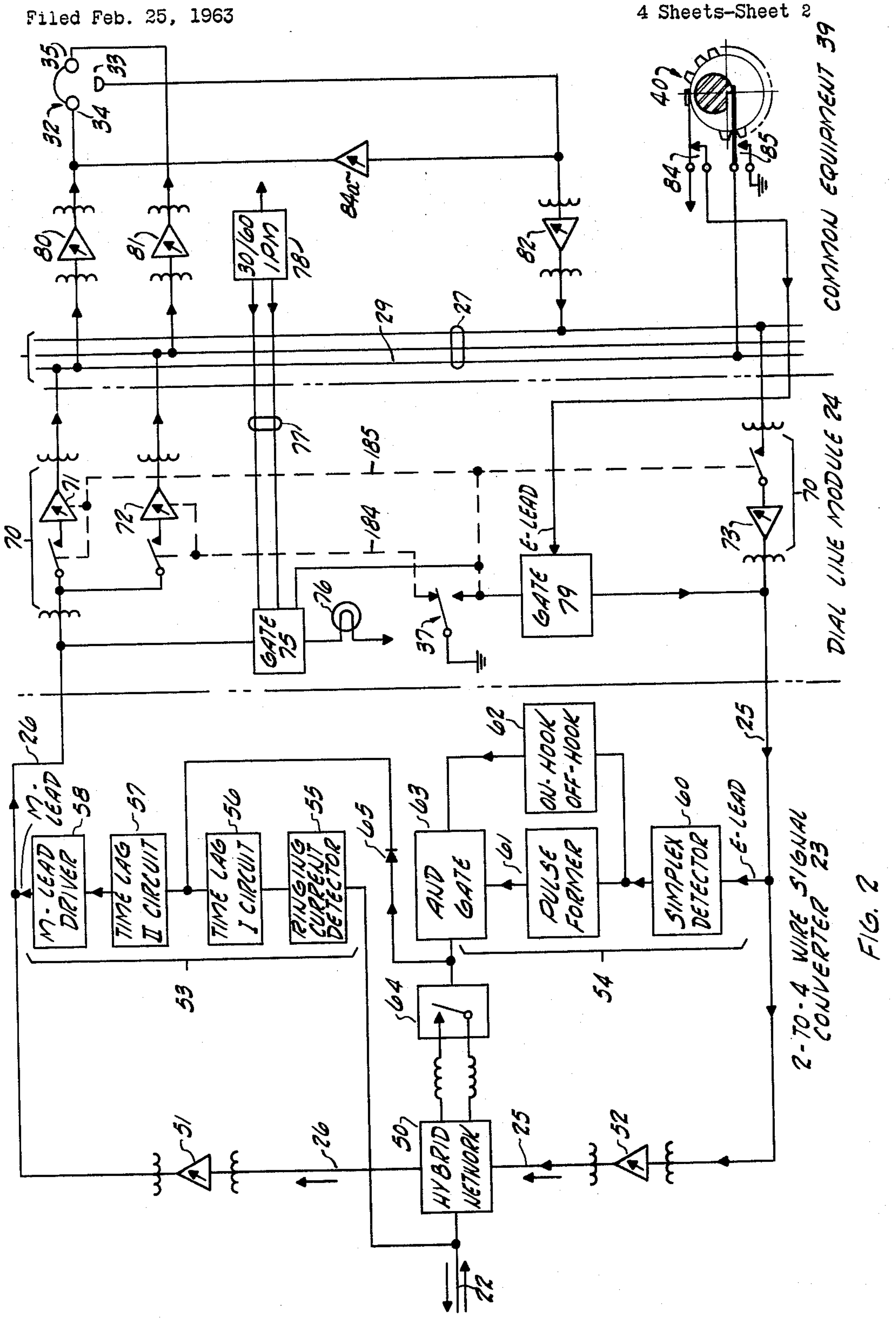
FIG. 2 is a block diagram of the sub-assemblies required to fill the hollow blocks of FIG. 1.

FIG. 2 shows the equipment required to provide the intercommunication system functions of FIG. 1. In greater detail, FIG. 2 is divided into three parts by dot-dashed lines. The 2-to-4 wire signal converter 23 is located on the lefthand side of the first dot-dashed lines; the dial line module 24 is shown between the dot-dashed lines; the common equipment 39 is on the right of the dot-dashed line.

The 2-to-4 wire signal converter 23 includes a conventional hybrid network 50 for interconnecting the two-wire line 22, the transmit pair 25, and the receive pair 26. Any suitable amplifier circuits 51, 52 make up transmission losses, including the hybrid losses. The converter 23 sends and receives conventional telephone signals over line 22 and E- and M-lead signals over lines 25, 26 respectively. These E- and M-lead signals are well known to those skilled in the telephone arts and described on page 833 of the book "Reference Data for Radio Engineers" (fourth ed.) published by the International Telephone and Telegraph Corporation. (i.e. a simplex signal circuit is superimposed on a voice circuit). The M-lead signals are transmitted from line 22 around hybrid network 50 and through a ringing signal detection circuit 53 to line 26, and the E-lead signals are transmitted from line 25 through circuits 54 to line 22.

The circuits 53 provide the following functions. As with all calls to subscriber lines, incoming calls are signaled by ringing current and detected at 55. Here, circuit 55 rectifies voltages of ringing potential, thus energizing a time lag I circuit 56 which prevents response to random ringing signal voltages which might occur during normal speech. After these ringing voltages have persisted long enough, circuit 56 conducts and energizes a time lag II circuit 57 which holds over insignificant interruptions of the ringing voltages. The output of the time lag II circuit 57 energizes an M-lead drive circuit 58 to signal the dial-line module 24.

The E-lead circuits 54 comprise a simplex detector 60 connected to the line 25. The output of this detector connects to an "on-off" circuit 61 (such as a multivibrator) adapted to form standard dial pulses having a 42% "on" and a 58% "off" content. A circuit 62 by-passes the pulse former to give a current continuity that constitutes on-hook, off-hook signals. The output of circuits 61, 62 coincide at an AND gate 63. Thus, an output current flows from the AND gate as long as an associated line is off hook and no dial pulses are present. When the operator manipulates a dial, this current is interrupted to form the required dial pulses. In any event, the output of AND circuit 63 controls the flow of current over line 22 as symbolically shown by the contacts 64.

A feedback circuit 65 disables the M-lead circuitry 53 while the associated operator station is "off-hook."

In the dial line module 24, the section 70 includes electronic voice switches 71, 72, 73 which correspond to the switches shown symbolically in FIG. 1 as contacts 38. The "off" or "on" condition of these switches determines whether the line 22 is connected to the microphone 33 or to the earphones 34, 35. The logic for operating these switches is shown at 37.

The dial line module 24 also includes a gate circuit 75 adapted to light or flash a lamp 76 responsive to the receipt of incoming ringing voltage signals. The lamp 76 may also be lit or flashed over conductors 77 according to the operation of a generator 78 in the common equipment 39. The generator is here shown as generating exemplary 30 or 60 i.p.m. pulse trains. Thus, a lamp flashing at 30 i.p.m. could indicate an unanswered, outgoing calling condition, and at 60 i.p.m. an unanswered, incoming called condition. A steady lamp could indicate a call in process. Obviously, other signals could also be used.

The hollow block 79 indicates that outgoing E-lead signals are gated from dial 40 directly through the dial line module 24 to the E-lead detector 60.

The common equipment 39 includes the common talkings busses 27, the 30/60 i.p.m. generator 78 and the headset 32. In addition, loss compensating amplifiers 80, 81, 82 are connected to the earphones 34, 35 and to the microphone 33. Amplifiers 84_a_ provides a desired amount of side tone. Finally, the common equipment includes the dial 40 with its pulsing contacts 84 and off-normal contacts 85. To keep the operator from hearing dial clicks, the contacts 85 ground the receive pair 29 during dialing.

*Ring detector 53*

Means are provided for detecting ringing potential voltages appearing on the two-wire line. In keeping with the principles of this invention, this detecting means includes a full wave rectifier bridge having an electronic breakdown device in each of its arms, the combination being connected across the two-wire line 22. The breakdown potentials of the devices are selected so that each is normally switched "off" when voice signal potentials are impressed across them. When the higher potentials of ringing signals are applied to the line, the break-down devices begin to conduct. This way the ring detector discriminates between voice and ringing signals.

Figure 3:
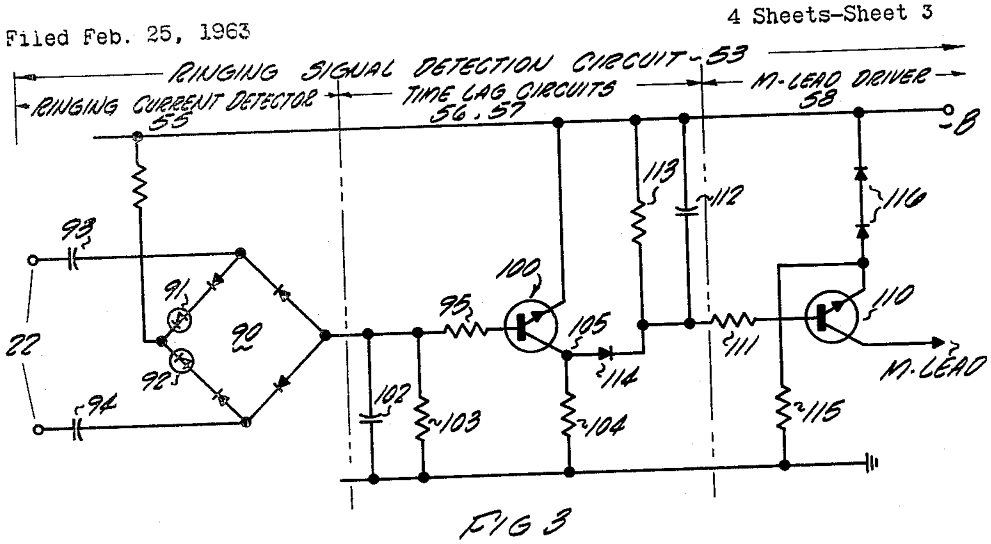
FIG. 3 is a schematic circuit diagram of a ring signal detector for converting ring-down signals into M lead signals.

In greater detail, an exemplary circuit including a ringing current detector is shown broadly at 53 in FIG. 2, and in detail, in FIG. 3. It comprises a detector part 55, a time lag circuit 56, 57, and an M-lead driver 58. The detector part 55 includes a full wave rectifier 90 having, in each arm, an electronic break-down device 91, 92, here shown as PNPN diodes. The rectifier 90 is capacitively coupled at 93, 94 to the two-wire line and resistively coupled at 95 to the succeeding time lag circuits 56, 57.

Figure 4:
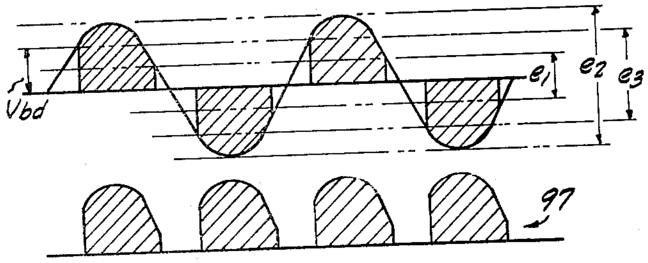
FIG. 4 is a voltage wave form explaining how the ring signal detector of FIG. 3 operates.

FIG. 4 is a voltage wave form which illustrates how the breakdown devices respond to changes in the voltages applied across them. Normal voice signals on line 22 cause a voltage swing over the dynamic range of voltage *e*1. Ringing current potentials on line 22 cause a voltage swing over the dynamic range *e*2. The circuit values are selected so that the breakdown devices 91, 92 do not conduct until the applied voltage reaches a breakdown potential $V_{bd}$. From an observation of the drawing, it will be apparent that this breakdown potential $V_{bd}$ is greater than the maximum potential of a normal voice signal and less than the potential of the ringing signals. Thus, during normal voice signals, the breakdown devices remain non-conductive. However, during peaks of ring voltages, the devices switch "on." The devices' characteristics are such that once they switch "on" they remain "on" as long as a holding current flows through them. Therefore, when a ringing signal is applied to the line, this breakdown action causes a state which continues until the voltage returns almost to the zero axis. This gives a voltage output from bridge 90 in the form of wave 97. From the foregoing it should be apparent that the bridge 90 provides means for discriminating between voice and ringing potentials.

Means are provided to guard against output signals responsive to random voice signals which simulate ringing signals by exceeding voltage $V_{bd}$. This guard function comes about owing to the time lag built into the circuits 56, 57. The principal components of this time lag circuit are a transistor 100 (here shown as an NPN device) coupled to the bridge 90. The transistor 100 base bias is supplied through an RC network 102, 103. Resistor 104 is a collector load. The circuit values are selected so that the transistor 100 normally conducts, thus point 105 is at the negative potential of battery B.

Before ringing current is received bridge 90 has a resistance in the order of several hundred thousand ohms. Therefore, the charge on capacitor 102 is fixed by the base current from normally "on" transistor 100 and by the connection through resistor 103 to ground. When the voltages applied across devices 91, 92 exceed $V_{bd}$, an increment of charge increase accumulates on capacitor 102. But this is not enough to cause transistor 100 to switch between its conductive states. When the excessive voltage terminates, this increase of charge on capacitor 102 begins to discharge through resistor 103. Thus, if the excessive voltage is a random occurrence, the incremental charge dissipates without effect. However, when ringing current occurs, the voltage increase on capacitor 102 can not discharge before bridge 90 conducts a second pulse and a further incremental charge increase accumulates on capacitor 102. The effects are (1) the pulses of ringing current are smoothed and (2) the base of transistor 100 soon goes negative. Thus, after a few cycles transistor 100 switches "off."

When the transistor 100 switches "off," an output or M-lead drive circuit 58 negatively energizes the M-lead. This drive circuit includes an output transistor 110 (here an NPN device), resistively coupled at 111 to the time lag circuits 56, 57. Base bias for transistor 110 is derived from the second part of the time lag circuit, capacitor 112 and resistor 113. Interposed between the collector of transistor 100 and the capacitor 112 is a diode 114 designed to speed the charging and delay the discharging of the capacitor. The transistor 110 emitter is biased by a voltage divider comprising resistor 115 and diodes 116. Circuit values are selected so that transistor 110 is normally "off."

When the transistor 100 turns "off" after a few cycles of ringing current occur, the capacitor 112 charges quickly over the path extending from battery B through capacitor 112, diode 114, and resistor 104 to ground. The base of transistor 110 goes positive, and it turns "on." The M-lead is now energized from negative battery B through diodes 116 and the emitter-collector circuit of transistor 110. When the ringing current disappears from line 22, capacitor 102 discharges through resistor 103. Transistor 100 turns "on" and back biases diode 114. Transistor 110 turns "off" after capacitor 112 discharges, and the M-lead loses its negative potential.

*Outgoing signaling circuit 64*

Figure 5:
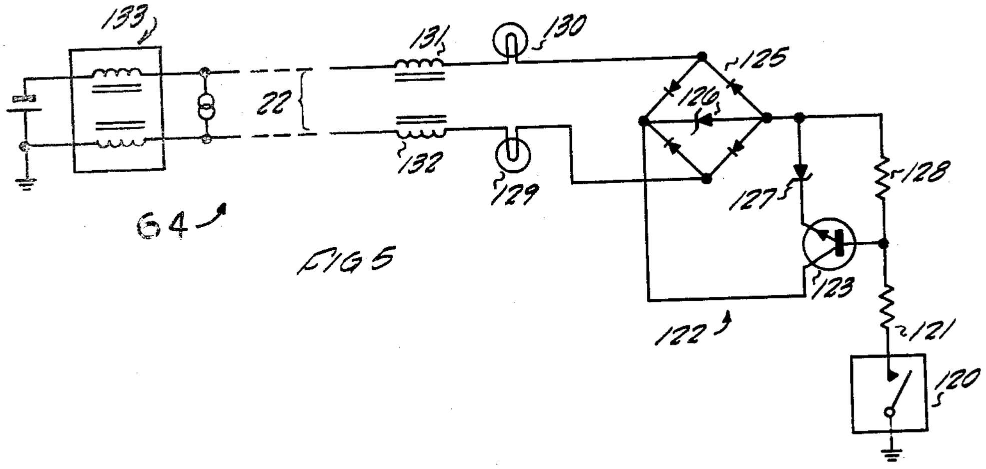
FIG. 5 shows, by schematic circuit diagram, the circuit required to complete a dialing loop.

Conventional open and closed loop signaling is shown broadly in FIG. 2 by the hollow block 64 and in detail in FIG. 5. Basically, this all electronic circuit constitutes means comprising a rectifier bridge and a breakdown device connected across the two-wire line to close a loop across the conductors of the line 22 for seizure purposes and pulsing the loop for dial signaling purposes.

The circuit of FIG. 5 comprises any suitable source of signals 120 which might be the familiar hook switch contacts, a conventional dial, or electronic logic circuitry. This source is resistively coupled at 121 to an electronic switching circuit 122 comprising a switch transistor 123 (here an NPN device), a bridge 125, and two zener diodes 126, 127. The resistor 128 provides the emitter to base bias for transistor 123. The bridge 125 provides the same polarity relations regardless of whether reverse battery answer supervision has or has not occurred. In series between the bridge 125 and the line 22 are two ballast lamps 129, 130 and two choke coils 131, 132. The choke coils give A.C. isolation between line 22 and bridge 125 at low currents. When the line currents exceed a given value the ballast lamps limit current after the coils saturate. Also, the choke coils match the impedance of similar coils 133 in the central office.

When switch 120 is open, transistor 123 is "off," and a very great impedance set by the two zener diodes 123, 126 exists between the line conductors 22. When switch 120 closes, the transistor 123 switches "on," the zener diodes 126, 127 break down and a very low impedance exists between the line conductors 22. Thus, open or closed loop pulses produced at contacts 120 are repeated to the line 22.

Figure 6:
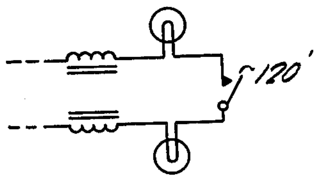
FIG. 6 shows an alternative embodiment for completing a dailing loop.

As shown in FIG. 6, a substitute circuit would place contacts 120' directly in series with the line. However, this would lose the electronic switching advantage and would cause radio frequency interference. Thus, the FIG. 6 device would not be used normally.

*Electronic relay*

The voice switch 38 is shown in FIG. 1 as mechanical contacts. Also shown as mechanical switches are contacts 37, 84, 85, and 120. As pointed out above, switches of this type cause radio frequency interference and otherwise defeat the requirements of a desirable intercommunication system. Thus, we have provided an electronic circuit which performs the function of these and electromechanical relay contacts.

Figure 7:
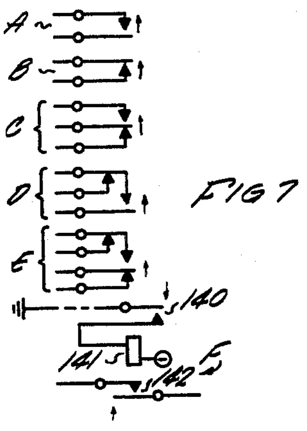
FIG. 7 shows relay contact combinations which illustrate conventional relay capabilities.

The requirements, functions, and capabilities of an electromechanical relay may here be reviewed briefly by a study of FIG. 7. When a relay winding is energized, its magnetic flux pulls an armature which pushes a pile-up of contact springs to open or close electrical circuits. When the winding is de-energized, the magnetic flux disappears, and the spring tension of the pile-up pushes the armature back to its normal position. The most commonly used combinations of contacts in the pile-up are shown in FIG. 7. Thus, as shown at A, relay contacts may simply close a circuit; or, at B, relay contacts simply open a circuit. At C the two functions are combined; the upper contacts close a circuit, and the lower contacts open a circuit. At D, the same is true except that the lower contacts must close before the upper contacts open. Part E is the same as part D except that the lowermost contacts must open before either of the other contacts operate. Part F combines contact combinations to illustrate how relay spring pile-ups are assembled. Here, contacts 140 close to lock relay 141 when operated, thus a memory function is provided. Contacts 142 close to complete a principal switching function (here the closure of a voice path).

This brief explanation (FIG. 7) is given solely to illustrate the functions which a good electronic relay substitute must perform. Upon reflection, it will be apparent that all relay functions may be restated this way. A set of contacts must have virtually infinite electrical isolation when open and virtually no electrical isolation when closed. We define infinite isolation as 80 db. Moreover, the contacts should be "modules" or otherwise adapted to give a construction ability by which the contacts may be fitted into an assemblage of desired combinations. Finally, the assemblage should provide for a memory function which will hold the contacts in a desired operated or unoperated position without requiring a continued input signal.

Figure 8:
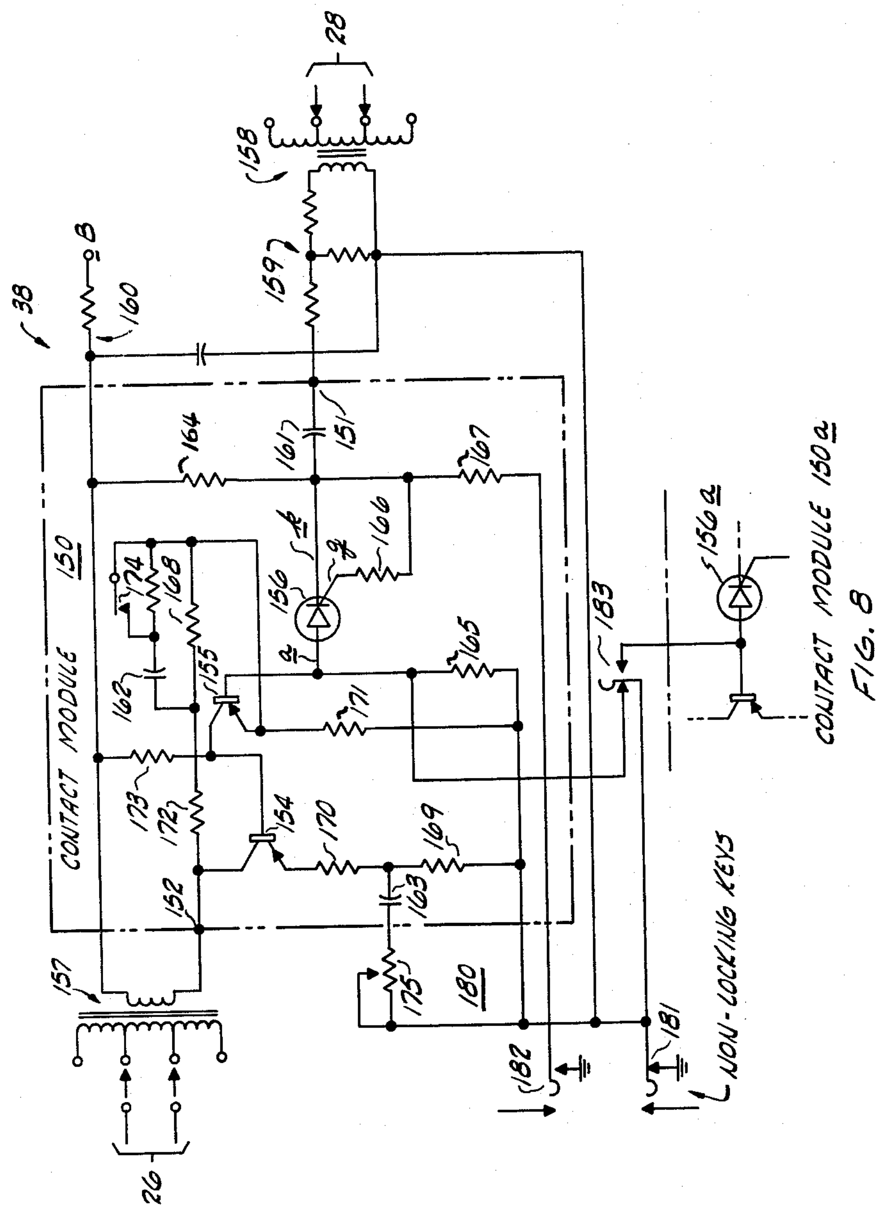
FIG. 8 is a schematic circuit diagram of an electronic relay.

In keeping with one aspect of this invention, the electronic circuitry of FIG. 8 provides these functions. When "open" the "contacts" (module 150) affords a minimum of 80 db. isolation between input and output points 151, 152, respectively. When "closed," the "contacts" afford no isolation, and in fact, a signal gain occurs between these two points.

This electronic relay circuit comprises a pair of transistor amplifiers 154, 155 (here PNP devices) connected in series with an electronic switch 156, or a breakdown device. In one exemplary embodiment the transistors were type 2N652 and the switch or breakdown device was a C5F silicon control rectifier.

These transistors are biased to form a pair of electronic amplifiers which are connected in a series with the electronic breakdown device. This series circuit is, in turn, connected between input and output terminals. One of the transistors 154 is driven into saturation and the other transistor 155 and the breakdown device 156 are switched "off" during open contact conditions. The other amplifier and device are switched "on" and the one transistor is biased for operation in a small signal amplification mode of operation during closed contact conditions. The remaining components have the functions indicated by the following table.

| Part | Name | Comment |
|---|---|---|
| 157 | Output Transformer | Converts from balanced to unbalanced line to save "contacts". |
| 158 | Input Transformer | |
| 159 | 3 db Pad | Not Used Always. |
| 160 | Power Supply Filter | |
| 161 | Input Capacitor | |
| 162, 163 | Bypass Capacitors | |
| 164, 165 | Bias Supply Resistor (Divider Network). | |
| 166, 167 | Triggering Circuit for (SCR) | |
| 168, 169 | Emitter Resistors | |
| 170, 171 | Feedback Resistors | |
| 172 | Overall Feedback Resistors | |
| 173 | Load Resistor | |
| 174 | Volume Control | |
| 175 | Volume Adj. Option | Introduces 16 db gain Reduction. |

With the foregoing description of circuit components in mind, it is though that the operation of the switching module 150 will become more apparent from the following description of circuit operations. Briefly, the silicon controlled rectifier 156 includes an anode *a*, a cathode *k*, and a gate electrode *g*. Even though the applied voltages are such that the anode to cathode circuit *a–k* is forward biased, no current will flow until the gate electrode *g* is pulsed. The rectifier 156 is normally biased "off," and the voltage at the base of transistor 155 is normally such that it too is switched "off." Simultaneously, a high negative potential is applied through resistor 173 to the base of transistor 154 so that it is switched "on," in saturation, and therefore effectively inoperative with respect to small A.C. signals. Thus, the input terminal 152 is effectively connected through the collector-emitter of transistor 154, resistor 170 and biasing circuit 180 to ground at contacts 181. Both the transistor 155 and electronic switch 156 are "off" to present an open circuit. This way, there is a maximum impedance between the input and output terminals, and the "contacts" are "open."

To "close" the contacts, key 182 is closed to apply a ground pulse to the gate electrode *g* of switch 156, the circuit being completed via resistors 167, 166. The switch 156 turns "on" and current flows from battery B through resistor 164 and switch 156 to the base of transistor 155. Once this current flow begins, an opening of key contacts 182 has no effect; the electronic switch remains "on" due to its internal characteristics. When the base of transistor 155 changes potential, it switches "on." The base of transistor 154 now goes to a bias potential which takes it out of saturation and causes it to operate as an amplifier of small A.C. signals. An A.C. path now extends from input terminal 151 through capacitor 161, the switch 156, the base of transistors 155, 154 to the output terminal 152. Thus, voice signals are transmitted from line 28 to line 26. A D.C. holding path is established from battery B through resistor 164, switch 156, resistor 165, and contacts 181 to ground.

To "open" the contacts, key 181 is pushed momentarily. This interrupts the path for sending "holding" current through the switch 156. A characteristic of a silicon controlled rectifier is that it switches "off" when current through it ceases. Thus, the "contacts" return to their normal "open" condition.

To provide the transfer functions exemplified by contacts 37, FIG. 2, electronic logic circuits switch the circuits symbolically shown as contacts 183 from the position shown in the drawing to close a circuit extending to switch 156a. When this occurs, the effective "contacts" are effectively transferred from the upper module 150 to the lower module 150*a*. Except for this difference, the two modules are identical. To illustrate this operation, FIG. 2 shows a dashed line 184. Thus, the circuit may switch from one earphone to the other earphone responsive to operation of contacts 37.

From the foregoing, it should be apparent that the electronic circuitry of the module provides for open and closed contacts, i.e. A and B combinations. The contacts 37 provide for a transfer from one contact to another, i.e. C contact combinations. Moreover, electronic logic can control the time and sequence of the switching and transfer functions. Thus, any combination of contact operations can be scheduled by the logic circuit connections. Moreover, the silicon controlled rectifier provides a memory function which corresponds to the latching of a relay. Quite obvious other advantages may also be cited. Thus, the citation of these particular advantages does not limit the invention in any manner.

While the principles of the invention have been described above in connection with specific apparatus and applications, it is to be understood that this description is made only by way of example and not as a limitation on the scope of the invention.

We claim:

1. An intercommunication system comprising a plurality of two-wire lines for extending connection between said system and distant offices, a plurality of dial line switching means, means comprising four-wire lines for completing connections through said system via said dial line switching means to said two-wire lines, means comprising 2-to-4 wire signal converters for interconnecting said two-wire and four-wire lines, a headset comprising at least one earphone and a microphone, a plurality of common talking busses extending through said dial line switching means, means associated with some of said busses for extending connections to said earphone, means associated with other of said busses for extending connections to said microphone, and means comprising said dial line switching means for independently switching the two-wire connections to said common busses, thereby individualizing the headset earphone and microphone to specific two-wire connections.

2. The system of claim 1 wherein each of said signal converters comprises means for detecting the appearance of ringing potentials on the two-wire lines, said detector means comprising a full wave rectifier bridge having at least one electronic breakdown device associated therewith to control the flow of bridge current, the breakdown potential of said device being greater than the maximum potential of normal voice signals and less than the potential of said ringing potentials.

3. The system of claim 1 and means associated with each of said converters for detecting calling signals appearing on said two-wire lines to initiate the completion of calls through said system, and means for guarding against output signals responsive to random voice signals which simulate said calling signals.

4. The system of claim 1 and electronic means associated with said converters for transmitting conventional open and closed loop signals from said system over said two-wire lines to said offices.

5. The system of claim 1 wherein said dial switching means comprises an electronic relay including a pair of electronic amplifiers and an electronic breakdown device connected in a series combination between input and output terminals, means for driving one of said amplifiers into saturation and switching "off" the other amplifier and said device during open contact conditions, and means for switching "on" said other amplifier and said device while biasing said one amplifier to a small signal amplification mode of operation during closed contact conditions.

6. The circuit of claim 5 there being a plurality of said electronic relays and electronic logic means for operating said relays to provide combinations of said contact conditions.

7. An intercommunication system comprising a plurality of two-wire lines for extending connections from said system to distant telephone offices, a plurality of four-wire lines for completing connections within said system, means comprising 2-to-4 wire signals converters for interconnecting said two-wire and four-wire lines, a plurality of common talking busses extending through said system and intersecting each of said four-wire lines, switching means at each of said intersections comprising an electronic relay having a pair of electronic amplifiers and an electronic breakdown device connected in a series combination between input and output terminals, means for driving one of said amplifiers into saturation and switching "off" the other amplifier and said device during open contact conditions, means for switching "on" said other amplifier and said device while biasing said one amplifier to a small signal amplification mode of operation during closed contact conditions, means comprising said electronic relay for selectively switching the two-wire connections to particular ones of said common busses, and means associated with said busses for transmitting and receiving signals when said contacts are closed.

8. An intercommunication system and means for extending connections from said system to distant telephone offices over conventional two-wire lines, said system comprising four-wire lines for completing connections within said system, means for detecting the appearance of ringing potentials on the two-wire lines, at least one electronic breakdown device, said detector comprising a full wave rectifier bridge for rectifying line currents only after breakdown of said electronic breakdown device, the breakdown potential of said device being greater than the maximum potential of normal voice signals and less than the potential of said ringing potentials, a plurality of common talking busses extending through said system and intersecting each of said four-wire lines, electronic relay means comprising a pair of transistors and a silicon controlled rectifier connected in a series circuit between the wire and bus at each intersection, means for driving one of said transistors into saturation and switching "off" the other transistor and said rectifier during open contact conditions, means for switching "on" said other transistor and said rectifier while biasing said one transistor to a small signal amplification mode of operation during closed contact conditions, and means comprising said electronic relay for electrically closing the four-wire lines to said common busses.

9. An interfacing system comprising a plurality of two-wire and four-wire lines interconnected by a communication network, a voice-to-electrical signal transducing means, a plurality of switching circuits for selectively coupling said transducing means to any of said two-wire lines, converter means for converting signals appearing in each of said networks into signals used in the other of said networks, said converter means comprising at least one rectifier bridge connected across said two-wire line, an electronic breakdown device coupled to control the flow of current through said bridge, means responsive to signal conditions in one of said networks for causing said device to break down and allow current to flow through said bridge, and means responsive to said current flow for extending signals to the other of said networks.

10. The system of claim 9 wherein said breakdown device normally electrically isolates the conductors of said two-wire line from each other, thus providing an open loop condition, means for causing said device to break down responsive to on-hook, off-hook, and dial signals, and means responsive to said control by said breakdown device for causing said bridge to conduct and place an effective short across said two-wire line thus providing a closed loop condition.

11. The system of claim 10 and signaling means comprising an E-lead for indicating the presence of open or closed loop signal conditions, and means responsive to signals appearing on said E-lead for selectively causing said breakdown device to conduct or block said bridge current, thus opening and closing said loop across said two-wire line.

12. The system of claim 9 wherein said breakdown device conducts responsive to ringing signal potential and does not conduct responsive to voice signal potentials, and means responsive to current in said bridge for energizing an M-lead.

13. The system of claim 12 and time lag means energized by said current in said bridge, said time lag means comprising a transistor having at least a capacitor coupled to control base bias, and means responsive to a plurality of rectified half-cycles of said ringing signal for charging said capacitor to a base bias control potential for switching said transistor between its "off" and "on" conditions, and means responsive to the switching of said transistor for energizing said M-lead.

14. The system of claim 13 and second time lag means comprising a second transistor having a base bias control capacitor, means responsive to the switching of the first named transistor for charging said second capacitor, means responsive to said charging of said second capacitor for switching said second transistor to energize said M-lead, and means responsive to said charge on said second capacitor for holding said M-lead energized during interruptions occurring between said half-cycles.

15. An intercommunication system comprising a plurality of two-wire lines for extending connections from said system to distant offices, a plurality of switching means, means comprising four-wire lines for completing connections within said system via said switching means, a headset comprising two earphones and a microphone, a plurality of common talking busses extending through said switching means, means associated with some of said busses for extending connections from a selected one of said two-wire lines to one earphone of said headset, means associated with other of said busses for extending connections from a two-wire lines to the other earphone of said headset, means associated with still other of said busses for extending connections from a two-wire line to said microphone, and means comprising said switching means for independently completing circuits from the two-wire lines to said common busses, thereby individualing the headset to specific connections with any selected ones of said two-wire lines.

16. The system of claim 15 and means for converting signals appearing in said two-wire offices and said four-wire system into signals used in the other of said offices or system, said converting means comprising at least one rectifier bridge connected across said two-wire line, an electronic breakdown device coupled to control the flow of current through said bridge, means responsive to signal conditions on said two- and four-wire lines for selectively causing said device to break down and allow current to flow through said bridge, and means responsive to said current flow for forwarding signals from one to the other of two- or four-wire lines.

17. The system of claim 16 wherein said breakdown device conducts responsive to ringing signal potentials and does not conduct responsive to voice signal potentials, means responsive to current in said bridge for energizing a time lag means, said time lag means comprising a first transistor having at least a capacitor coupled to control base bias, means responsive to a plurality of rectified half-cycles of said ringing signal for charging said capacitor to controlling base bias potential for switching the first transistor between its "off" and "on" conditions, means comprising a second transistor also having a base bias control capacitor, means responsive to the switching of said first transistor for charging said second capacitor, means responsive to said charging of said second capacitor for switching said second transistor energize an M-lead associated with a four-wire line, and means responsive to said charge on said second capacitor for holding said energization on said M-lead during interruptions occurring between said half-cycles of said ringing current.

18. The system of claim 16 wherein said breakdown device normally electrically isolates the conductors of said two-wire line from each other, thus providing open loop signals, means for causing said device to break down responsive to on-hook, off-hook, and dial signals, and means including an E-lead associated with said four-wire lines for causing said breakdown device to conduct, thus causing current flow through said bridge and effectively closing a loop across said two-wire line.

19. An electronic relay comprising a pair of electronic amplifiers and an electronic breakdown device connected in a series combination between input and output terminals, said amplifier and device having a first condition simulating open relay contacts and a second condition simulating closed relay contacts, means for driving one of said amplifiers into saturation and switching "off" the other amplifier and said device during said open contact conditions, and means for switching "on" said other amplifier and said device while biasing said one amplifier to a small signal amplification mode of operation during said closed contact conditions.

20. The relay of claim 19, there being a plurality of said series combinations, and electronic logic means for selectively operating said simulated contacts in combinations to provide conventional make-break contact transfer functions.

No references cited.

KATHLEEN H. CLAFFY, *Primary Examiner.*

S. J. BOR, *Assistant Examiner.*